United States Patent [19]

Naudin

[11] Patent Number: 5,105,680

[45] Date of Patent: Apr. 21, 1992

[54] DAMPED DOUBLE FLYWHEEL FOR A MOTOR VEHICLE

[75] Inventor: Jacky Naudin, Metz-Vallieres, France

[73] Assignee: Valeo, Paris, France

[21] Appl. No.: 715,643

[22] Filed: Jun. 14, 1991

[30] Foreign Application Priority Data

Jun. 15, 1990 [FR] France ................. 90 07526

[51] Int. Cl.⁵ ............................................ F16H 15/12
[52] U.S. Cl. ................... 74/574; 192/106.2; 74/573 F
[58] Field of Search ............. 74/572, 573 F, 574; 192/106.1, 106.2; 464/66, 67, 68

[56] References Cited

U.S. PATENT DOCUMENTS

| | | | |
|---|---|---|---|
| 4,788,884 | 12/1988 | Reik et al. | 74/574 |
| 4,816,006 | 3/1989 | Friedmann | 464/68 X |
| 4,856,636 | 8/1989 | Meinhard | 74/574 X |
| 4,944,712 | 7/1990 | Worner et al. | 464/67 |
| 4,946,420 | 8/1990 | Jackel | 464/67 X |
| 4,961,487 | 10/1990 | Langeneckert | 192/106.2 |
| 5,005,686 | 4/1991 | Reik et al. | 74/574 X |

FOREIGN PATENT DOCUMENTS

| | | |
|---|---|---|
| 3841639 | 12/1989 | Fed. Rep. of Germany . |
| 3901571 | 8/1990 | Fed. Rep. of Germany ........ 74/574 |
| 2441761 | 6/1980 | France . |
| 2613447 | 10/1988 | France . |
| 2629166 | 9/1989 | France . |
| 2217430 | 10/1989 | United Kingdom . |

Primary Examiner—Dwight Diehl
Attorney, Agent, or Firm—Longacre & White

[57] ABSTRACT

A damped double flywheel, for a motor vehicle, comprises two coaxial inertia masses which are mounted for rotation relative to each other against the action of a first series and a second series of springs. One of the inertia masses includes a damper plate having radial arms.

An intermeidate pad is interposed radially between each spring of the first series and an associated spring of the other series. The springs are arranged to cooperate in pairs with the radial arms of the damper plate, and are arranged radially outwardly of the outer periphery of the main disc-like portion of the damper plate.

10 Claims, 1 Drawing Sheet

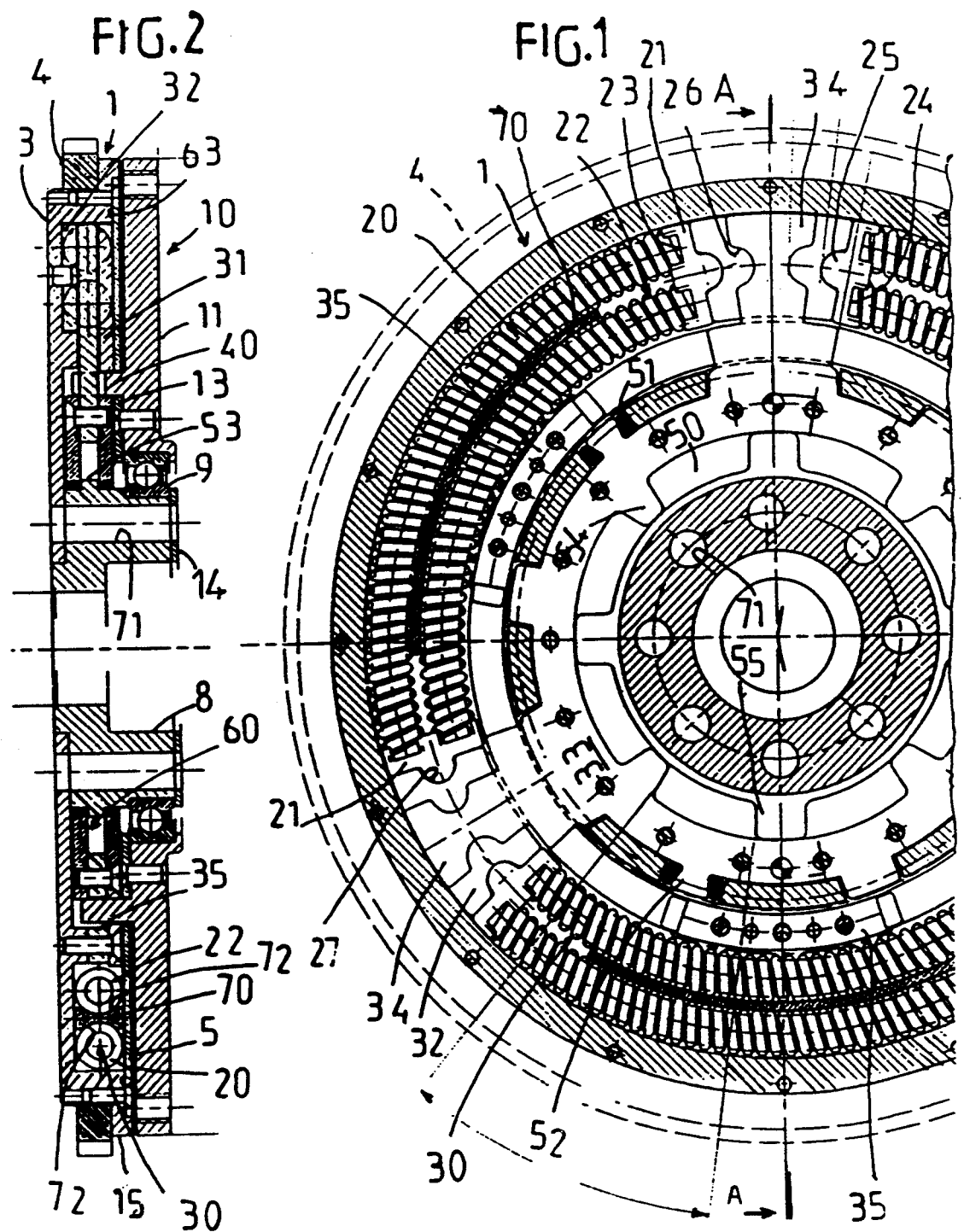

DAMPED DOUBLE FLYWHEEL FOR A MOTOR VEHICLE

FIELD OF THE INVENTION

This invention relates to a damped double flywheel, especially for a motor vehicle, of the kind comprising two coaxial inertia masses which are mounted for relative rotation with respect to each other against the action of a first series and a second series of circumferentially acting resilient means which are arranged on two respective coaxial pitch circles, with the pitch circle of the second series being of smaller diameter than that of the first series.

BACKGROUND OF THE INVENTION

A double flywheel of the above kind is disclosed in the specification of French published patent application No. FR 2 629 166A. In that specification, the two series of resilient means are arranged to cooperate with a damper plate which is part of one of the two inertia masses, and with guide rings which are part of the other inertia mass. The damper plate is provided with windows in which the resilient means of the second series are engaged, while the first series is arranged at the outer periphery of the damper plate and is arranged to intercept arms formed on the damper plate.

That arrangement does enable the axial size of the assembly to be reduced, but at the cost of greater radial size. In this connection, the damper plate has integral bar-like elements which define the said windows, and these bar-like elements have to have at least a certain thickness for reasons of mechanical strength and for manufacturing reasons, particularly in connection with pressing operations. In addition, frictional effects occur between these bar-like elements and the resilient means of the two said series.

DISCUSSION OF THE INVENTION

An object of the present invention is to overcome these drawbacks, and to provide a damped double flywheel of the kind having two series of circumferentially acting resilient means, in which the flywheel is of a reduced axial size while still having a damper plate of sufficient strength, and with wear effects associated with the resilient means being reduced.

In accordance with the invention, there is provided a damped double flywheel for a motor vehicle, comprising two inertia masses mounted for rotation with respect to each other against the action of a first series and a second series of circumferentially acting resilient means, which are arranged coaxially on respective pitch circles with the diameter of the pitch circle of the second series being smaller than that of the pitch circle of the first series, one of the two said inertia masses having guide rings for cooperation with the two series of resilient means, and the other said inertia mass including a damper plate having radial arms for cooperation with the resilient means, wherein intermediate pads are interposed radially between the first series and the second series of resilient means, and both series of resilient means are arranged to cooperate with the radial arms of the damper plate, being disposed radially outwardly of the periphery of a main portion of the damper plate from which the radial arms extend outwardly.

The invention enables the damper plate to be simplified, and avoids the use of the bar-like elements to define the windows mentioned above, these windows now being absent. As a result, the two series of resilient means can be brought closer together radially. In addition, the torque that may be transmitted is increased, because the second or inner series of resilient means can be arranged on a pitch circle of a larger diameter than previously. In the region of the radial arms, the mechanical strength of the damper plate is increased since the absence of the above mentioned windows avoids the points of weakening associated with them. For a given radial size of double flywheel, the arrangement according to the invention releases some internal space, in which a viscous damping means can easily be accommodated. Alternatively, or in addition, the useful size of a viscous damping means arranged within the flywheel can be increased.

Finally, the arrangement according to the invention enables the damper plate to be driven by means of tenons which are arranged radially between the viscous damping means and the circumferentially acting resilient means, so that the axial length of the double flywheel at its inner periphery is reduced.

In accordance with a preferred feature of the invention, the intermediate pads are so shaped as to act as cradles for the associated resilient means. With this feature, friction can be reduced, and the components of the double flywheel surrounding the circumferentially acting resilient means are able to be simplified, since they need not be so configured as to receive the latter. The intermediate pads thus also serve as guide pads.

In accordance with a further preferred feature of the invention, the axial width of the intermediate pads is greater than that of the circumferentially acting resilient means. This reduces friction even more. This arrangement is of advantage when the circumferentially acting resilient means are mounted in a cavity, so that the intermediate pads, acting as spacing means, prevent any lateral contact taking place between the resilient means and the components defining the cavity in which they are mounted.

Preferably, the circumferentially acting resilient means, which are typically in the form of coil springs, are mounted on the guide rings through insert members which are common to both of the two series of circumferentially acting springs. These insert members, which provide end seatings for the springs, lead to a reduction in friction while also simplifying the shape of the radial arms of the damper plate. With this arrangement, the intermediate pads can be made with a circumferential length which is shorter than the springs themselves, which ensures correct operation of the latter while allowing the relative rotation between the two inertia masses to be large.

A preferred embodiment of the invention will now be described, by way of example only and with reference to the accompanying drawings.

BRIEF DESCRIPTION OF THE DRAWINGS

FIG. 1 is a partial front view, seen in cross section, of a double flywheel showing the interior of the cavities formed in it.

FIG. 2 is a view in axial cross section taken on the line A—A in FIG. 1.

DESCRIPTION OF A PREFERRED EMBODIMENT OF THE INVENTION

The drawings show a damped double flywheel for a motor vehicle. The flywheel comprises two coaxial inertia masses 1 and 10, which are mounted for limited rotation with respect to each other against the action of two series of circumferentially acting resilient means 20 and 22, and against the action of a viscous damping means 60.

The first mass 1 comprises a housing 3 which is closed by a cover plate 5, together with a central hub 8. The hub 8 is secured to the nose of the crankshaft (not shown) of the internal combustion engine of the motor vehicle, by means of a plurality of bolts or studs (not shown) which extend through holes 71 formed in both the hub 8 and the housing 3. The inertia mass 1 can be referred to as an input mass. The same fastening bolts or studs that secure the hub 8 to the crankshaft also secure the base of the housing 3 to the hub 8. The housing 3 carries a starting crown 4 on its axially orientated outer peripheral flange 15.

The cover plate 5 is secured by means of screws to the outer flange 15 of the housing 3. The latter is hollow, and in this example it is annular, as is the cover plate 5.

Guide rings 31 and 32 are mounted on the inertia mass 1 for rotation with it. In this example the guide rings 31 and 32 are in the form of a plurality of blocks. The guide rings 31 and 32 are sealingly secured by riveting to the inertia mass 1, the blocks 32 being secured by rivets to the base of the housing 3 while the blocks 31 are fixed to an internal ring which is itself fastened by means of screws to the base of the housing 3, with spacing members 35 that carry, at their circumferential ends, plug elements of resilient material.

A damper plate 33 is coupled to the second inertia mass 10 for rotation with the latter, and is arranged in a position which lies axially between the guide rings 31 and 32. The coupling between the damper plate 33 and the second inertia mass 10 may be a loose coupling, i.e. one defining a circumferential clearance between them. The damper plate 33 has radial arms 34, which are arranged to intercept the first series 20 of the above mentioned resilient means, which in this example consist of a plurality of coil springs operatively interposed between the two inertia masses 1 and 10. The springs 20 are mounted close to the outer flange 15 of the housing 3, on a common pitch circle indicated in phantom in FIG. 1 and effectively at the outer periphery of the double flywheel.

It will be seen that the damper plate 33 consists of a generally annular main part with the arms 34 extending radially outwardly from the outer periphery of the latter. The damper plate 33 is interposed mechanically between the springs 20 and the viscous damping means 60, while the guide rings 31 and 32 are components of a first part of a torsion damper, which also has a second part that includes the damper plate 33.

The circumferential length of each of the springs 20 is large. Each spring 20 is mounted without clearance between two pivoting end thrust inserts or insert members 21. Each insert 21 lies between a guide block 31 and a guide block 32, so that each spring 20 is mounted between two consecutive blocks 32 and two consecutive blocks 31. For this purpose, the blocks 31 and 32 are arranged in line with each other axially. They are mounted without clearance between two consecutive radial arms 34 of the damper plate 33. The inserts 21 are arranged to intercept the radial arms 34, and in this example there is a circumferential clearance, in the normal or rest position of the assembly, between each insert 21 and the associated radial arm 34. However, in a modification this clearance may be absent.

The second series 22 of circumferentially acting resilient means has a similar stiffness to the first series of springs 20, and is mounted in a similar way so as to intercept the radial arms 34 of the damper plate 33. In this example the second series 22 also consists of a plurality of coil springs, mounted in the same way (without clearance) between the inserts 21 and between two consecutive blocks 31 and 32.

The springs 22 are shorter in the circumferential direction than the springs 20, and are arranged on a second pitch circle, again indicated in FIG. 1 in phantom, lying coaxially within the pitch circle on which the springs 20 lie, i.e. having a smaller diameter. In the present example there are four springs 20 and four springs 22. They are all mounted with a clearance between the consecutive radial arms 34, through the inserts 21.

The inner periphery of the outer flange 15 of the housing 3 is surface treated in order to reduce fretting effects caused by the springs 20 under the action of a centrifugal force. In a modification, the springs 20 may be provided with bearing pads, each of which is mounted on a turn of the spring for contact with the flange 15. These bearing pads then have the effect of reducing fretting.

The second inertia mass 10 includes an annular plate 11 which constitutes the reaction plate of a clutch. The friction disc (not shown) of the clutch, which is fixed to the input shaft of the gearbox of the vehicle, is arranged to engage with the reaction plate 11. The inertia mass 10 therefore constitutes an output mass.

A bearing 9 is interposed radially between the annular plate 11 and the hub 8, being mounted on appropriate axial surfaces of the plate 11 and hub 8. The bearing 9 enables the second inertia mass 10 to become offset axially with respect to the first inertia mass 1, and may comprise an anti-friction bearing or a rolling bearing as indicated in the drawings. The bearing 9 is located axially on the hub 8 by a shoulder formed on the latter (see FIG. 2), and by an end ring 14 which is abutted against the right hand end face of the hub 8 as shown in FIG. 2. The end ring 14 acts as an abutment for the securing bolts, mentioned above, of the hub 8.

The bearing 9 is located axially on the annular plate 11 partly by means of a shoulder formed in the latter, and partly by means of a locating ring 13 (see FIG. 2), which is secured to the reaction plate 11 by rivets adjacent to the viscous damper 60.

The springs 20 and 22 are arranged inside a first cavity 30, which is defined mainly by the first inertia mass 1, and in particular by the housing 3, cover plate 5 and spacing member 35. For the rest, the cavity 30 is defined by the damper plate 33, with the radial arms 34 of the damper plate extending into the interior of the cavity 30 between the spacing members 35. The cavity 30 is, in this example, partly filled with a lubricating fluid for the springs 20, typically a grease.

The viscous damper 60 is interposed mechanically between the inertia mass 1 and the damper plate 33, and includes a sealed second cavity 50, which is filled with a second fluid, separate from the first fluid in the first cavity 30. The second cavity 50 is defined between the inertia masses 1 and 10, and lies radially inwardly of the inner ring of springs 22. Appropriate seals, shown in faint lines in FIG. 2, are of course provided for sealing the respective cavities 30 and 50. One of these seals can be seen in FIG. 2 at 63.

The viscous damping means 60 defines a viscous enclosure which is fixed with respect to the damper plate 33. It is arranged axially between the base of the housing 3 and the reaction plate 11. The second cavity 50 is bounded axially by two cover elements in the form of discs or annular closure elements. These closure elements are spaced apart axially from each other by the annular damper plate 33, and are secured to each other by means of screws passing through the damper plate 33. In a modification, each of these annular closure elements may be secured to the damper plate 33 by a welded seam or by adhesive fastening. If welding is used, this is preferably carried out by a laser welding process. This arrangement enables the radial size of the viscous damper 60 to be reduced in the region of its outer periphery, thus increasing the useful volume of the viscous damper.

The second cavity 50 is also bounded in the radial direction internally by the hub 8, which has a radially projecting flange 53 interposed axially between the two annular closure elements and axially aligned within the coaxial damper plate 33. The flange 53 acts as an internal carrying element, which carries teeth 55 that extend radially into the cavity 50 in a direction away from the axis of the assembly. The flange 53 thus locates the viscous damping means 60 axially on the first inertia mass 1.

The damper plate 33 acts as an outer carrying element, bounding the cavity 50 on its radially outward side. The damper plate 33 has a further set of radial teeth 54 on its inner periphery, extending in the radial direction opposite to that of the teeth 55. The teeth 54 are arranged alternately with the teeth 55, with calibrated passages existing in particular between the teeth 54 and 55 and the annular closure elements or discs of the viscous damper. The teeth 54 and 55 define chambers between them, and in operation the volume of these chambers varies. In a modification, the teeth may be omitted, and in that case the flange 53 is in the form of a disc and is arranged to be offset with respect to the annular closure discs of the viscous damper so as to define narrow passages between the latter.

The second fluid with which the second cavity 50 is filled (and in this example it is partially filled) is a high viscosity fluid such as a silicone. The viscous damping means is arranged so as to exert a viscous damping effect at the lowest engine regimes by transfer of fluid between the chambers, and in particular on starting and stopping of the engine, when the system passes through the resonant frequency below the slow running mode of the engine.

The damper plate 33 is slotted so as to accommodate axial projections 40 of the reaction plate 11, with a slight clearance. The projections 40 enable the damper plate 33 to be driven by the reaction plate 11 in rotation. The damper plate 33 is provided with radial teeth 52 (FIG. 1), each of which lies between two of the projections 40.

Each of these teeth 52 is surrounded by a resilient ring 51 for reducing noise or impact. The driving projections 40 extend radially between the first cavity 30 and the second cavity 50, within the free interior space that is made available by the arrangement described.

The projections 40 are thin, and extend directly from the reaction plate 11. They also act as centring means for the viscous damper 60, and they cooperate with the cover plate 5 so as to define narrow passages through which grease cannot escape. As can be seen from FIG. 2, the projections 40 are in this example in the form of tenons alternating with mortices, so that the reaction plate 11 has the form of an annular comb in the region of these tenons and mortices. The tenons and mortices are formed on the end of a cylindrical sleeve and are thus generally in the form of an arc of a circle. The damper plate 33, being coupled in rotation with the reaction plate 11, has complementary slots for cooperation with the tenons 40 (FIG. 2).

The series of springs 20 and the series of springs 22 are, as has already been seen, arranged to cooperate with the radial arms 34 of the damper plate 33, being disposed radially outwardly of the outer periphery of the central, disc-like main part of the damper plate 33. In conjunction with this arrangement, a series of intermediate pads 70 are interposed radially between the springs 20 and the springs 22, with (in this example) a pad 70 between each spring 20 and the spring 22 with which it forms a pair for cooperation, through the inserts 21, with the radial arms 34.

The pads 70 are preferably of a synthetic material, which may be reinforced with fibers, and have a low coefficient of friction. In FIG. 1, there are four of these pads, with each pad being interposed radially between two associated springs 20 and 22 arranged concentrically with each other. The pads 70 are so shaped as to act as cradles and guides for the springs 20 and 22 mounted as a pair between two consecutive radial arms 34.

The cradles comprises circular slots 72, which are formed respectively on the inner periphery and outer periphery of each pad 70. Each pad 70 is in the form of an annular sector, and is shorter in the circumferential direction than the associated springs 20 and 22, so as not to prevent the required relative angular displacement between the two inertia masses 1 and 10 of the flywheel. The intermediate pads 70 may be narrower than the associated springs, but they are preferably made wider than the springs in the axial direction, in such a way that the latter are prevented from making frictional contact against the base of the housing 3 or the cover plate 5. The intermediate or guide pads 70 thus form a spacing means between the cover plate 5 and the housing 3.

It will be noted that, due to the presence of the guide pads 70, the housing 3 and cover plate 5 may be provided in a simple form, which would not for example be possible in the arrangement disclosed in the above mentioned specification of French published patent application No. FR 2 629 166A, in which the housing and the cover plate have to be machined.

The pivoting insert members 21 are so shaped as to receive the associated springs 20 and 22, for which the insert 21 forms a common thrust seat. To this end, each insert 21 has on one of its faces two respective annular sockets 23 and 24 for receiving the end of the respective spring 20, 22. The opposite face of the insert 21 has a central, semi-circular head portion 25 for cooperating with a complementary recess 27 formed in the respective guide rings 31 and 32, and with another complementary recess 26 formed in the associated arms 34 of the damper plate 33. In this way each insert 21 is accurately located.

During the relative displacement between the inertia masses 1 and 10, the motion is transmitted via the guide rings 31 and 32 to the damper plate 33, with the viscous damping means 60 intervening. On starting of the vehicle, the viscous damper 60 acts initially by itself, with the springs 20 and 22 only beginning to act after the clearance between the radial arms 34 and the inserts 21 has been taken up, whereupon the springs come effectively into engagement on the radial arms 34 through the inserts 21.

During this movement, it is not possible for the springs 20 and 22 to interfere with each other, because of the presence of the intermediate pads 70, which prevents the springs from becoming deformed out of their circular shape. In addition, the springs 20 and 22 operate under very favourable conditions even though they are arranged on a pitch circle of large diameter and are subjected to centrifugal force. The inserts 21 also facilitate correct operation of the springs 20 and 22. They pivot under the action of the centrifugal force and are arranged to cooperate frictionally with the flange 15. It should be mentioned at this point that the inserts 21 are made of a material having a low coefficient of friction, such as a fiber reinforced plastics material.

The inserts 21 enable the circumferential length of the pads 70 to be made (as has already been mentioned) smaller than that of the springs 20 and 22, so as to enable the two inertia masses 1 and 10 to perform a large relative angular displacement between them. This displacement is shown in the lower part of FIG. 1, and is determined by the distance separating one tooth 54 from one tooth 55. The arrangement described above, in accordance with the invention, makes interior space available in such a way that the size of the viscous damper is able to be increased radially, and this reduces the number of teeth necessary for the latter, which in turn enables the angular displacement between the two inertia masses to be increased.

As will also be clear from the foregoing description and from the drawings, the two series of springs 20 and 22, which in this example have the same diameter, enable the more usual arrangement, which consists of a single series of larger diameter springs, to be dispensed with; and this reduces the axial length of the double flywheel. The interior space which is made available also enables the axial size of the double flywheel to be reduced in the region of its inner periphery, due mainly to the projections 40. In a modification, the radial size of the double flywheel may also be reduced. It is possible to fit the various components within the housing 3 by successive insertion, with the reaction plate 11 being finally fitted by insertion on to the sub-assembly so created.

The present invention is of course not limited to the embodiment and variations thereof described above. In particular, the first inertia mass 1 may be arranged as an output mass and the second inertia mass 10 as an input mass. The internal carrying element 53 may be mounted with a clearance with respect to the hub 8, for example by means of a series of splines.

In addition, the damper plate 33 may be arranged for rotation only with the viscous damping means 60, and may be fitted on to the latter by insertion.

The presence of the first cavity 30 is not mandatory, and the springs 20 and 22 may be unlubricated and may consist of blocks of a resilient material. These blocks or springs 20 and 22 may be mounted with a clearance between windows formed in conventional guide rings forming part of the first inertia mass 1.

Equally the presence of the viscous damping means 60 is not mandatory. In that case, the damper plate 33 may be driven by being secured on to the reaction plate 11 by means of suitable spacers. Finally, there may be a plurality of intermediate pads 70 associated with each pair of springs 20 and 22.

What is claimed is:

1. A double damped flywheel comprising a first inertia mass, a second inertia mass, means mounting said first and second inertia masses coaxially with each other for relative rotation of one with respect to the other, and circumferentially acting resilient means interposed between the said first and second inertia masses and coupling them together whereby the said relative rotation takes place against the action of the said resilient means, the latter comprising a first series of resilient means defining a first pitch circle and a second series of resilient means defining a second pitch circle of smaller diameter than the first pitch circle and coaxial therewith, the said first inertia mass comprising guide rings cooperating with the resilient means of the said first and second series, the said second inertia mass including a damper plate comprising a central main portion and a plurality of radial arms projecting radially outwardly from the central main portion for cooperation with the said first series of resilient means, the double flywheel further including a plurality of intermediate pads, interposed radially between the resilient means of the said first series and those of the said second series, with both of the said series of resilient means being arranged in cooperating relationship with the said radial arms of the damper plate and being disposed radially outwardly of the outer periphery of the said central main portion of the damper plate.

2. A double flywheel according to claim 1, wherein each said intermediate pad is configured as a cradle for the associated circumferentially acting resilient means.

3. A double flywheel according to claim 2, wherein the circumferentially acting resilient means of each said series comprises a plurality of coil springs, with each said intermediate pad having an outer periphery and an inner periphery each of which is formed with a circular slot for receiving the associated spring of the respective said series.

4. A double flywheel according to claim 1, wherein each said intermediate pad is wider axially than the associated said springs.

5. A double flywheel according to claim 1, wherein the circumferentially acting resilient means of each said series comprises a plurality of coil springs, with each said spring being mounted between two consecutive said radial arms of the damper plate, the double flywheel further comprising a plurality of insert members, with each spring of the said first series being arranged as a pair with a corresponding spring of the second series, and with the springs of each said pair being arranged in common engagement at each of their ends with a respective one of the said insert members.

6. A double flywheel according to claim 5, wherein each said insert member has two opposed faces, with two annular sockets formed in one said face, the corresponding end of each spring of the associated said pair of springs being received in a respective one of the said sockets.

7. A double flywheel according to claim 6, wherein each said insert member has on its other face a central, semicircular head portion, each said guide ring having a recess complementary with a said head portion and each said radial arm of the damper plate having a further recess complementary with the said head portion, whereby each head portion cooperates with the said recesses in the guide rings and radial arms.

8. A double flywheel according to claim 1, wherein each said series of circumferentially acting resilient means comprises a plurality of coil springs, arranged in pairs with each pair comprising a spring of the said first series and a spring of the second series, each pair being mounted between two consecutive radial arms of the damper plate, each said intermediate pad being arcuate in shape and being mounted radially between the two springs of a respective said pair, the circumferential length of the intermediate pad being smaller than that of the springs of the associated said pair.

9. A double flywheel according to claim 1, wherein the said inertia masses define a first sealed cavity, the two said series of circumferentially acting resilient means being mounted in the said first cavity, the double flywheel further comprising viscous damping means arranged between the two inertia masses for damping the said relative rotation between the latter, the viscous damping means defining a second cavity coupled for rotation with the damping plate, the said first and second cavities containing respective damping fluids different from each other, the two series of circumferentially acting resilient means being mounted radially outwardly of the viscous damping means, and the double flywheel further including a housing and a cover plate fixed to the housing and defining the said first cavity, with the said intermediate pads being disposed between the said cover plate and housing whereby to space them apart from each other.

10. A double flywheel according to claim 9, wherein the said second inertia mass includes a reaction plate and a plurality of projections carried by the reaction plate, the said projections being associated with the damper plate whereby to drive the latter, and extending radially between the viscous damping means and the resilient means of the said second series.

* * * * *